(12) United States Patent
Pesiridis et al.

(10) Patent No.: US 7,481,730 B2
(45) Date of Patent: Jan. 27, 2009

(54) MULTIPLE INPUT, DUAL OUTPUT ELECTRIC DIFFERENTIAL MOTOR TRANSMISSION SYSTEM

(75) Inventors: R. Alex Pesiridis, Clearwater, FL (US); Andrew J. Christian, Gainesville, FL (US)

(73) Assignee: Solomon Technologies, Inc., Tarpon Springs, FL (US)

( * ) Notice: Subject to any disclaimer, the term of this patent is extended or adjusted under 35 U.S.C. 154(b) by 0 days.

(21) Appl. No.: 11/552,207

(22) Filed: Oct. 24, 2006

(65) Prior Publication Data
US 2007/0093342 A1    Apr. 26, 2007

Related U.S. Application Data

(60) Provisional application No. 60/730,274, filed on Oct. 26, 2005.

(51) Int. Cl.
*F16H 3/72* (2006.01)
(52) U.S. Cl. .......................................................... 475/5
(58) Field of Classification Search ........................ None
See application file for complete search history.

(56) References Cited

U.S. PATENT DOCUMENTS

| | | | |
|---|---|---|---|
| 5,067,932 | A | 11/1991 | Edwards |
| 5,851,162 | A | 12/1998 | Tether |
| 2008/0045365 | A1* | 2/2008 | Usoro ........................... 475/5 |

* cited by examiner

*Primary Examiner*—Dirk Wright
(74) *Attorney, Agent, or Firm*—Nutter, McClennen & Fish, LLP

(57) ABSTRACT

A multiple input, dual output, electric motor transmission device includes a ring gear and a ring gear motor for driving the ring gear. A first planetary gear set is engaged to the ring gear for geared rotation with respect to the ring gear and a first sun gear is engaged to the first planetary gear set for geared rotation with respect to the first planetary gear set. A first output shaft and a first electric motor are provided, wherein the first output shaft is coupled to a first one of the first planetary gear set and the first sun gear and a rotor of the first electric motor is coupled to a second one of the first planetary gear set and the first sun gear. A second planetary gear set, similar to the first planetary gear set, is also engaged to the ring gear for geared rotation with respect to the ring gear.

16 Claims, 3 Drawing Sheets

MULTIPLE INPUT, DUAL OUTPUT ELECTRIC DIFFERENTIAL MOTOR TRANSMISSION SYSTEM

RELATED APPLICATIONS

This application claims priority to U.S. Provisional Patent Application No. 60/730,274, entitled "System and Apparatus for a Multiple Input and Dual Output Electric Differential Motor Transmission Device Utilizing One Ring Gear," and filed on Oct. 26, 2005. That Provisional Application is incorporated herein in its entirety.

FIELD OF THE INVENTION

The invention relates generally to a system for propelling various types of vehicles that incorporate or require multiple output propulsion devices. In particular, the invention relates to a motor transmission system for an electric vehicle that uses a plurality of combined electric motor and transmission devices with a continuously variable speed output and a stored energy supply for powering the device.

BACKGROUND OF THE INVENTION

It has long been a goal in the art to find a combination power source (i.e., drive) and transmission device that can deliver the peak output of the power source over a large range of the rotational speed (rpm) output of the transmission device. Further, it is preferable that this peak power be output from the transmission device, or from the drive device incorporating the transmission device, at continuously variable speeds of rotation over a large range of the speed of rotation of the output. A transmission device making possible such properties is known in the art as an infinite speed transmission device. The term "drive and transmission device" or "combination motor and drive device" is employed in the present disclosure to describe the case of the device including the drive means (i.e., power source means) as well as the transmission means. The term "motor and transmission device" or "combination motor and transmission device" is employed for the case of the drive means including an electric motor means, as the drive means (i.e., power source).

Known transmission devices typically involve a single rotational mechanical input and a single rotational mechanical output. Such known transmission devices, whether manual or automatic, may typically employ a set of gears. In these transmissions, the ratio of the speed of rotation of the input to the speed of rotation of the output is one of a set of fixed values corresponding to the set of gears. These typically involve a large number of parts, undesirable weight for many applications particularly in vehicle propulsion, and high losses due to multiple transfers of the power between the many components within the transmission device, or within the drive device incorporating the transmission device.

Differential units and planetary gear units are known in the art as transmission devices. Known planetary gear types of transmission devices involve an inner sun gear, an outer ring gear and a set of planetary gears held by a hub to rotate between the sun gear and the ring gear. When the sun gear rotates with respect to the ring gear, the planetary gears rotate between them, and the hub rotates accordingly, coaxially with the sun and ring gears. In a typical prior art use of the planetary gear unit, the hub is fixed, and either the sun gear or the ring gear is driven as the rotational mechanical input, the other providing the rotational mechanical output. Alternatively, either the sun gear or the ring gear can be fixed, the other is either the rotational mechanical input or output, and the hub provides the other of the rotational mechanical input or output.

One advance in infinite speed drive and transmission devices is described in U.S. Pat. No. 5,067,932 to Edwards, entitled Dual-Input Infinite Speed Integral Motor and Transmission Device. This patent, which is hereby incorporated by reference in its entirety, provides an infinite speed combination motor and transmission device having two inputs, with at least one of the inputs being an integral combination of an electric motor element and a transmission unit element. In one embodiment, two integral electric motors provide input to two of the three gear units in a planetary gear system (the ring gear and planetary gear hub, in particular) with the third gear providing an infinitely variable mechanical output (the sun gear in this case).

An important advantage of the Edwards patent is that the braking of a vehicle can be performed by using the electric motors as generators, namely by regenerative braking. In the case of a battery powered car, the kinetic energy of the vehicle can be converted back into useable electricity charged back into the battery, and hence available for subsequently propelling the car. Thus, a small lightweight hydraulic brake, such as on each wheel, suffices as backup and emergency brakes for the vehicle. The infinite-speed characteristic of the combination motor and transmission device is particularly useful for this purpose, namely in being able to adjust the device for maximum regeneration. In generic terms this involves converting the mechanical output into an input, and the two electric motor inputs into two outputs, or one output and one input.

A still further advance is described in U.S. Pat. No. 5,851,162 to Tether. This patent, which is hereby incorporated herein by reference, relates generally to a system for propelling various types of vehicles that incorporate or require multiple output propulsion devices. In particular, the Tether patent relates to a motor transmission system for an electric vehicle that uses a plurality of combined electric motor and transmission devices with a continuously variable speed output and a stored energy supply for powering the device. This device sets out to reduce the cost and complexity of electric motor transmission devices while at the same time reducing the complexity of its control.

In one specific example, the Tether patent provides a multiple input, dual output differential motor transmission device that incorporates a sun gear device having first and second sun gears fixedly connected to each other whereby the first and second sun gears rotate together along a common axis of rotation; first and second ring gear devices having first and second ring gears, respectively; and first and second sets of planetary gears. The first set is inter-engaged between the first sun and ring gears, while the second set is inter-engaged between the second sun and ring gears. The first sun and ring gears are concentrically and independently rotatable relative to each other with the first set of planetary gears inter-engaged therebetween. The second sun and ring gears are concentrically and independently rotatable relative to each other with the second set of planetary gears inter-engaged therebetween. Rotation of at least one of the first and second sun gears together, the first ring gear and the second ring gear generates at least one of rotational and revolving movement of a corresponding one of the first and second sets of planetary gears.

While the Tether patent adds significantly to the art, motor-transmission device configurations that continue to reduce the number of moving parts and allow the device to be used in ever smaller spaces will allow the adoption of such devices into more and more applications.

SUMMARY OF THE INVENTION

The invention provides electric motor transmission devices and systems in which first and second planetary gear drives are provided with a single ring gear. Advantages of the invention include fewer moving parts and better abilities to handle higher power inputs and outputs than previous systems. The devices and systems of the invention can provide such advantages in both motor and regeneration modes.

In a first aspect, a multiple input, dual output, electric motor transmission device having first and second planetary gear drives is provided. The device includes a ring gear and a ring gear motor for driving the ring gear. A first planetary gear set is engaged to the ring gear for geared rotation with respect to the ring gear and a first sun gear is engaged to the first planetary gear set for geared rotation with respect to the first planetary gear set. A first output shaft and a first electric motor are provided, wherein the first output shaft is coupled to a first one of the first planetary gear set and the first sun gear and a rotor of the first electric motor is coupled to a second one of the first planetary gear set and the first sun gear. A second planetary gear set is also engaged to the ring gear for geared rotation with respect to the ring gear and a second sun gear is engaged to the first planetary gear set for geared rotation with respect to the first planetary gear set. A second output shaft and a second electric motor are also provided, wherein the second output shaft is coupled to a first one of the second planetary gear set and the second sun gear and a rotor of the second electric motor is coupled to a second one of the second planetary gear set and the second sun gear.

In a further aspect, a differential motor transmission system for driving at least two wheels of a vehicle is provided. The system includes a ring gear and a ring gear motor for driving the ring gear. A first planetary gear set is engaged to the ring gear for geared rotation with respect to the ring gear and a first sun gear is engaged to the first planetary gear set for geared rotation with respect to the first planetary gear set. A first output shaft and a first electric motor are also provided, wherein the first output shaft is coupled to a first one of the first planetary gear set and the first sun gear and a rotor of the first electric motor is coupled to a second one of the first planetary gear set and the first sun gear. A second planetary gear set is also engaged to the ring gear for geared rotation with respect to the ring gear and a second sun gear is engaged the first planetary gear set for geared rotation with respect to the first planetary gear set. A second output shaft and a second electric motor are provided wherein the second output shaft is coupled to a first one of the second planetary gear set and the second sun gear and a rotor of the second electric motor is coupled to a second one of the second planetary gear set and the second sun gear.

BRIEF DESCRIPTION OF THE DRAWINGS

The invention will be more fully understood from the following detailed description taken in conjunction with the accompanying drawings.

DETAILED DESCRIPTION OF THE ILLUSTRATED EMBODIMENTS

Figure 1:
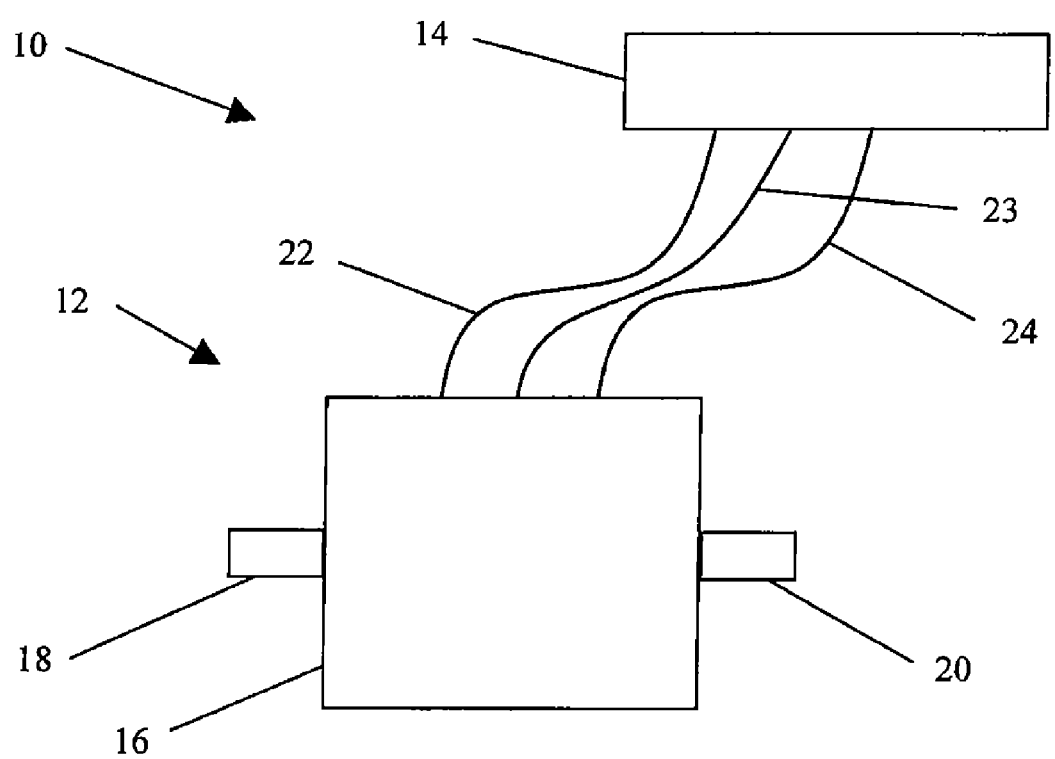
FIG. 1 provides a diagram of a multiple input, dual output electric differential motor transmission system of the invention.

A system 10 of the invention, as illustrated in FIG. 1, includes a multiple input, dual output differential motor transmission device 12. The motor transmission device 12 includes an integrated motor transmission unit 16 having a first output shaft 18 and a second output shaft 20. Integrated motor transmission unit 16 incorporates a ring gear device and first and second sets of planetary gears and first and second sun gear devices, as will be further described below. While described as output shafts herein, output shafts 16,18 can be used to input energy into the integrated motor transmission unit 16 for the purpose of regeneration—or converting kinetic or mechanical energy into electrical energy, typically applied to charge a battery.

System 10 can also include a control unit 14 that delivers power (and receives power in regeneration mode) from at least three electric motor-generators within the integrated motor transmission unit 16, in the illustrated embodiment, through three electrical connections 22,23,24.

Figure 2:
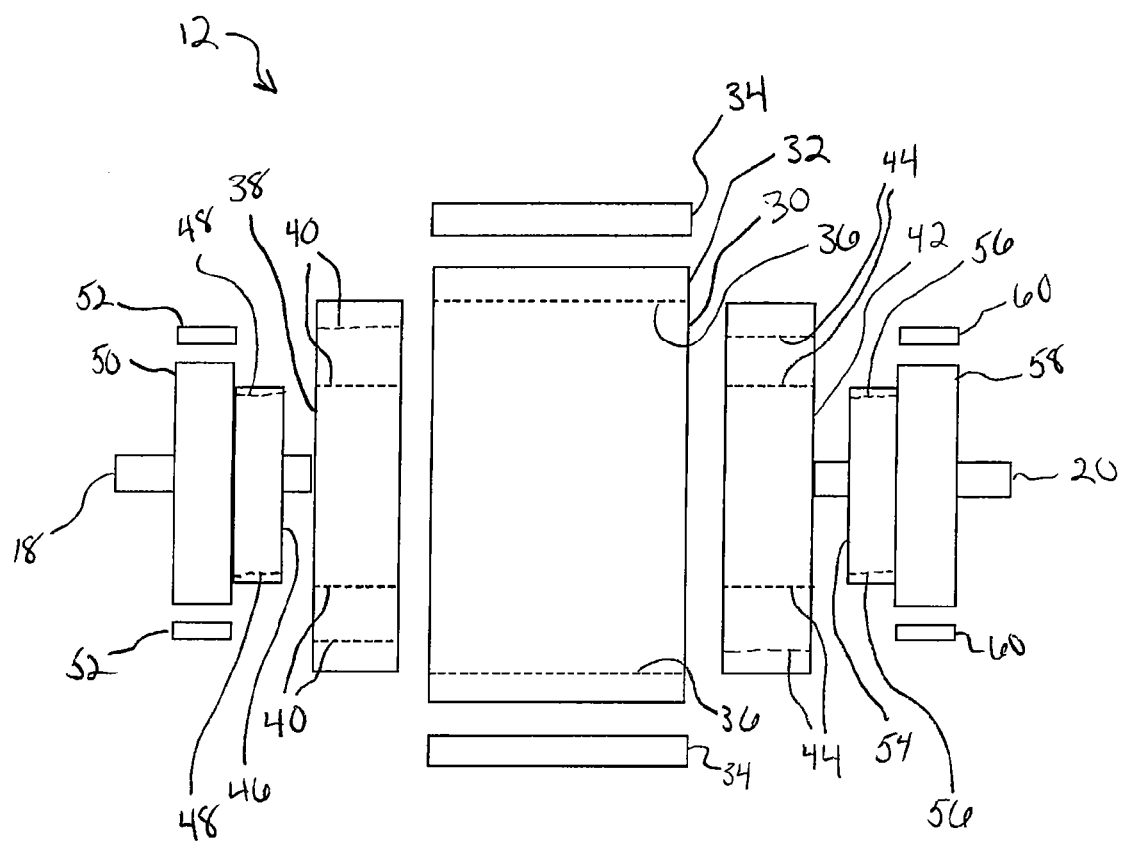
FIG. 2 provides an exploded view of a multiple input, dual output differential motor transmission device of the system of FIG. 1.
Figure 3:
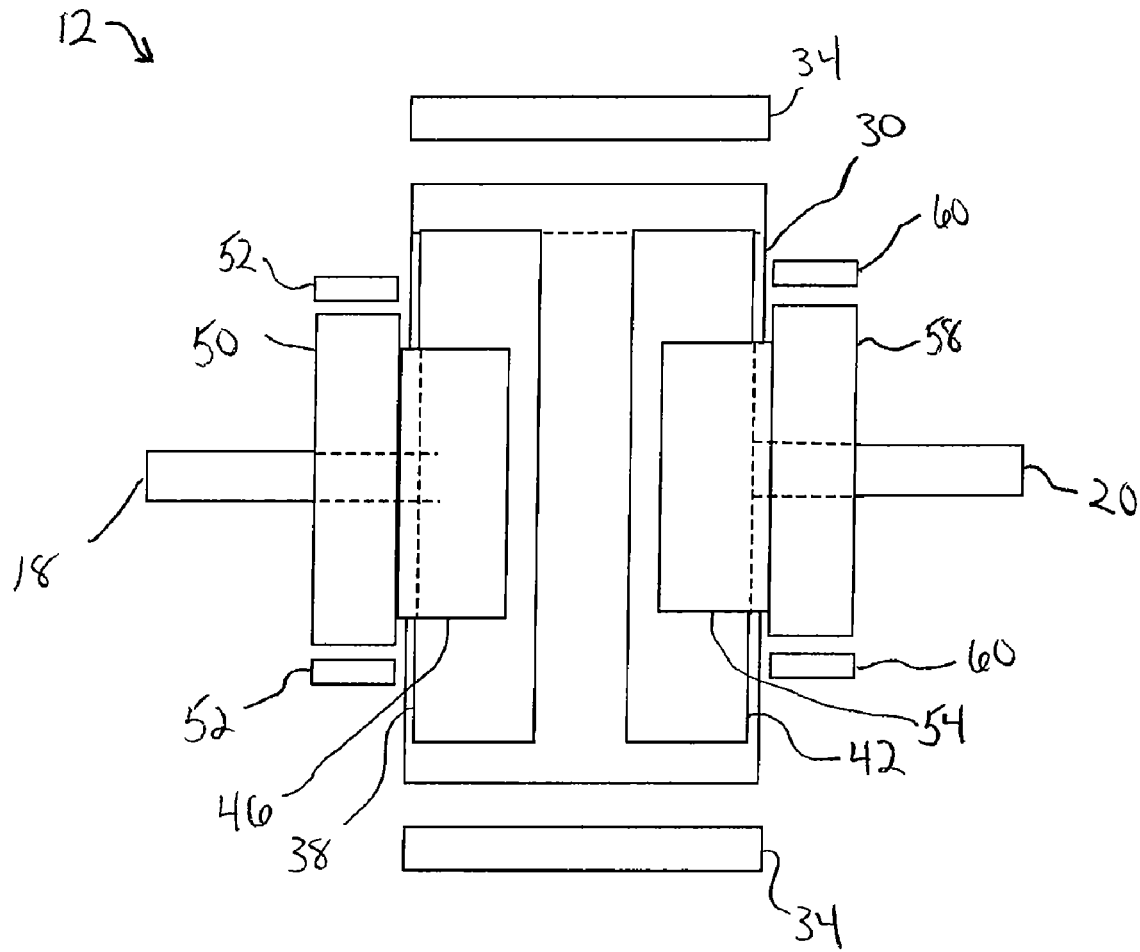
FIG. 3 provides an assembled view of a multiple input, dual output differential motor transmission device of the system of FIG. 1.

A preferred embodiment of the multiple input, dual output differential motor transmission device 12 is illustrated in an exploded view and assembled view in FIGS. 2 and 3, respectively. In the illustrated embodiment, a single ring gear 30 is provided for two planetary gear sets housed in the integrated motor transmission unit 16 having inner gear teeth 36. The ring gear 30 can driven by a ring gear electric motor-generator having an integral ring gear motor-generator rotor 32 built into the ring gear. A ring gear motor-generator stator 34 can be built into a housing of the integrated motor transmission unit 16 to cooperate with rotor 32 to form a ring gear electric motor-generator that can drive the single ring gear, or generate electricity from its motion. The integration of the electric motor generator with the ring gear can also be accomplished in the manner described with respect to FIGS. 4 and 5 of U.S. Pat. No. 5,067,932 to Edwards, incorporated by reference above.

A first planetary gear set 38 is provided in mechanical cooperation with the ring gear 30, with planet gear teeth 40 meshing with ring gear teeth 36, on the left side of the motor transmission device 12. One example of such cooperation between a ring gear and planetary gear set can be seen in FIG. 4 of U.S. Pat. No. 5,851,162 to Tether, incorporated by reference above. Such planetary gear sets typically include a rotatable hub on which at least one, but typically more than one, planetary gears can rotate. Similarly, a second planetary gear set 42 is provided in mechanical cooperation with the ring gear 30, with planet gear teeth 44 meshing with ring gear teeth 36, on the right side of the motor transmission device 12.

A first sun gear 46 is provided in mechanical cooperation with the first planetary gear set 38, with sun gear teeth 48 meshing with planet gear teeth 40, on the left side of the motor transmission device 12. First sun gear 46 has a first sun gear rotor 50 solidly connected thereto, and a first sun gear stator 52 that, along with first sun gear rotor 50, forms a first sun gear motor-generator. A second sun gear 54 is provided in mechanical cooperation with the second planetary gear set 42, with sun gear teeth 56 meshing with planet gear teeth 44, on the right side of the motor transmission device 12. Second sun gear 54 has a second sun gear rotor 58 solidly connected thereto, and a second sun gear stator 60 that, along with second sun gear rotor 50, forms a second sun gear motor-generator.

In the illustrated embodiment, first output shaft 18 is coupled to the first planetary gear set 38 and the second output shaft 20 is coupled to the second planetary gear set 42. This arrangement allows for the first and second planetary gear outputs to rotate independently of each other providing for what is commonly know as a differential axle.

A person of ordinary skill will recognize that on either side of the electric motor transmission unit 12, one or the other of the sun gear and planetary gear set can include an electric motor-generator, while the other is connected to the output shaft. Systems of the invention thus utilize a single ring gear for two planetary gear transmission drives in a differential axle—resulting in fewer moving parts, and better abilities to handle higher power inputs and outputs than has previously been possible.

Stepping motor configurations, or other electric motors readily controllable by digital controlling means, are particularly useful for controlling the angular position of the gears they drive as a function of time, and accordingly the speed of the gears. As is known in the art, the torque output of such motors typically falls with increasing rotational speed, from a maximum torque at zero or low rpm. By contrast, the typical power output quickly rises with increase in rpm from zero to a plateau value of the output power, namely power output remains at this plateau for a very large range of rpm.

When such motors are employed as inputs of the transmission device of the present invention, the sum of the peak powers of the two motors (ring and first motor to drive the first shaft, or ring and second motor to drive the second shaft) is effectively available at the output, when each motor is driven at a rotational speed above the minimum speed for providing the plateau value for its peak power output.

As is easily understood, this total peak power output of the transmission device of the present invention is available at any output speed. Accordingly, at low output speed, the output torque can be very high.

The transmission device of the invention is particularly advantageous for use in the drive devices which might be employed in a battery powered vehicle. It is lightweight and efficient, and is easily controlled to provide a desired output rotational speed (rpm). In such a vehicle, the two output shafts of the device of the invention can be connected to axles or wheels so that two wheels of the vehicle may be driven as is common in front or rear wheel drive automobiles.

In a further advantageous embodiment of the present invention, one or more electric motors may be substituted with a different powerplant structure. This would then produce a hybrid differential motor transmission system. For example, the ring gear electric motor could be replaced with a fossil fuel motor such as an internal combustion engine commonly found in cars and trucks as the powerplant structure. An outer surface of the ring gear 30 can be engaged with a drive gear connected to a drive shaft of the powerplant.

In an automotive vehicle application of the hybrid differential motor transmission described, the first and second electric motors may be energized for short range or city-type driving. The fossil fuel motor or other powerplant can then be energized for long distance or highway driving, or for recharging the electrical power supply of the system.

Use of computer control in the drive device of the present invention could be provided according to the principles described in U.S. Pat. Nos. 5,067,932 and 5,851,162 (previously incorporated by reference), as well as using the systems and methods described in U.S. Published Patent Application 2006-0208570 to Christian et al., entitled "System and Method for Automating Power Generation, Propulsion, and Use Management," which application published on Mar. 10, 2006 (which is hereby incorporated by reference in its entirety). Individual control of the speed of each output of the differential motor transmission of the invention (whether completely electric or hybrid) can be effective for providing reliable acceleration, avoiding loss of traction and corresponding spinning of a drive wheel, and braking of the vehicle. In a hybrid vehicle, the controller can not only control the first and second electric motors, but can monitor and/or control the mechanical input from the powerplant to the ring gear.

Braking, in particular, can be performed by the drive devices of the present invention being used as generators, namely by regenerative braking. In the case of a battery powered car, the kinetic energy of the vehicle can be converted back into useable electricity charged back into the battery, and hence available for subsequently propelling the car. The infinite-speed characteristic of the combination motor and transmission device of the present invention is particularly useful for this purpose, namely in being able to adjust the device for maximum regeneration.

The invention being thus disclosed and illustrative embodiments depicted herein, further variations and modifications of the invention will occur to those skilled in the art. All such variations and modifications are considered to be within the scope of the invention, as defined by the claims appended hereto and equivalents thereof.

What is claimed is:

1. A multiple input, dual output, electric motor transmission device, comprising:
   a ring gear;
   a ring gear motor for driving the ring gear;
   a first planetary gear set engaging the ring gear for geared rotation with respect to the ring gear;
   a first sun gear engaging the first planetary gear set for geared rotation with respect to the first planetary gear set;
   a first output shaft;
   a first electric motor;
   a second planetary gear set engaging the ring gear for geared rotation with respect to the ring gear;
   a second sun gear engaging the first planetary gear set for geared rotation with respect to the first planetary gear set;
   a second output shaft;
   a second electric motor;
   wherein the first output shaft is coupled to a first one of the first planetary gear set and the first sun gear, a rotor of the first electric motor is coupled to a second one of the first planetary gear set and the first sun gear, the second output shaft is coupled to a first one of the second planetary gear set and the second sun gear, and a rotor of the second electric motor is coupled to a second one of the second planetary gear set and the second sun gear.

2. The device of claim 1, wherein the ring gear motor is an electric motor and the rotor of the ring gear electric motor comprises the ring gear.

3. The device of claim 1, wherein the device is a hybrid device and the ring gear motor is a powerplant other than an electric motor.

4. The device of claim 1, wherein each electric motor is operable as a generator.

5. The device of claim 2, wherein each electric motor is operable as a generator.

6. The device of claim 4, wherein a controller is electrically connected to each electric motor to control speed, torque, and regeneration characteristics of the device.

7. The device of claim 5, wherein a controller is electrically connected to each electric motor to control speed, torque, and regeneration characteristics of the device.

8. The device of claim 1, wherein the first output shaft is coupled to the first planetary gear set.

9. The device of claim 8, wherein the second output shaft is coupled to the second planetary gear set.

10. A differential motor transmission system for driving at least two wheels of a vehicle, the system comprising:
- a ring gear;
- a ring gear motor for driving the ring gear;
- a first planetary gear set engaging the ring gear for geared rotation with respect to the ring gear;
- a first sun gear engaging the first planetary gear set for geared rotation with respect to the first planetary gear set;
- a first output shaft;
- a first electric motor;
- a second planetary gear set engaging the ring gear for geared rotation with respect to the ring gear;
- a second sun gear engaging the first planetary gear set for geared rotation with respect to the first planetary gear set;
- a second output shaft;
- a second electric motor;
- wherein the first output shaft is coupled to a first one of the first planetary gear set and the first sun gear, a rotor of the first electric motor is coupled to a second one of the first planetary gear set and the first sun gear, the second output shaft is coupled to a first one of the second planetary gear set and the second sun gear, and a rotor of the second electric motor is coupled to a second one of the second planetary gear set and the second sun gear.

11. The system of claim 10, further comprising a controller for controlling the outputs of the first and second electric motors and the ring gear motor to provide desired drive and regeneration characteristics in the vehicle.

12. The system of claim 11, wherein the ring gear motor is an electric motor and the rotor of the ring gear electric motor comprises the ring gear.

13. The system of claim 11, wherein the device is a hybrid device and the ring gear motor is a powerplant other than an electric motor.

14. The system of claim 13, wherein the powerplant is an internal combustion engine.

15. The system of claim 11, wherein the first output shaft is coupled to the first planetary gear set.

16. The system of claim 15, wherein the second output shaft is coupled to the second planetary gear set.

* * * * *